US008996046B2

(12) United States Patent
Gosselin

(10) Patent No.: US 8,996,046 B2
(45) Date of Patent: Mar. 31, 2015

(54) SYSTEMS AND METHODS FOR ENHANCED DISPLAY OF 411 INFORMATION ON A MOBILE HANDSET

(75) Inventor: Mark Gosselin, Seattle, WA (US)

(73) Assignee: Cequint, Inc., Seattle, WA (US)

(*) Notice: Subject to any disclaimer, the term of this patent is extended or adjusted under 35 U.S.C. 154(b) by 533 days.

(21) Appl. No.: 12/555,731

(22) Filed: Sep. 8, 2009

(65) Prior Publication Data
US 2011/0059758 A1 Mar. 10, 2011

(51) Int. Cl.
*H04M 1/725* (2006.01)
*H04W 4/12* (2009.01)

(52) U.S. Cl.
CPC ............ *H04M 1/72552* (2013.01); *H04W 4/12* (2013.01)
USPC ........................................................ 455/466

(58) Field of Classification Search
CPC ..... H04M 1/72552; H04W 4/12; H04W 4/02; H04W 4/14; H04W 88/02
USPC ............. 455/404.2, 412.1, 412.2, 414.3, 466, 455/550.1
See application file for complete search history.

(56) References Cited

U.S. PATENT DOCUMENTS

| 2002/0035474 | A1* | 3/2002 | Alpdemir | 704/270 |
| 2007/0129054 | A1* | 6/2007 | Andronikov et al. | 455/404.2 |
| 2007/0203736 | A1* | 8/2007 | Ashton | 705/1 |
| 2007/0293200 | A1* | 12/2007 | Roundtree et al. | 455/414.1 |
| 2009/0124271 | A1* | 5/2009 | Roundtree et al. | 455/466 |
| 2010/0099441 | A1* | 4/2010 | Agarwal et al. | 455/466 |

OTHER PUBLICATIONS

"Mobile Messaging Network Application Handbook," www.tekelec.com/resource-center, 1 page, printed Jul. 7, 2010.
"Mobile Advertising Creating New Revenue Opportunities with SMS-Based Advertising," www.telec.com pp. 9, printed Jul. 7, 2010; copyright 2008, 2009.

* cited by examiner

Primary Examiner — Dinh P Nguyen
(74) Attorney, Agent, or Firm — Lowe Graham Jones PLLC

(57) ABSTRACT

Systems and methods for automated retrieval of digital content from vendors upon occurrence of a 411 call event from a mobile device. In an example method, a message is sent from the mobile device based on the detected 411 call event. A server receives the sent message, compiles associated digital content based on information in the received message, and sends the digital content to the mobile device. The mobile device outputs/displays at least a portion of the received digital content to the user soon after the occurrence of the 411 call event.

14 Claims, 3 Drawing Sheets

SYSTEMS AND METHODS FOR ENHANCED DISPLAY OF 411 INFORMATION ON A MOBILE HANDSET

FIELD OF THE INVENTION

This invention relates generally to 411 calls and, more specifically, to enhanced information delivery based on a 411 call event.

BACKGROUND OF THE INVENTION

When a 411 operator or Directory Assistance (DA) is dialed on a wireless handset, carriers or their 411 service providers (DAs) can optionally provide a Short Message Service (SMS) message to the mobile handset over an SMS network from the operator's station containing the requested caller information, mapping information, etc. to supplement the expected oral delivery and connection of the caller to the requested number. For example, the SMS message may contain the information "John Doe, 206-555-1212" embedded in an SMS message confirmation of the inquiry.

While useful, the method of delivering information to the subscriber via basic SMS is constrained by technical limitations of the SMS. Only text information may be sent, which is limited to 160-characters. Therefore, the prior capabilities have some limitations.

SUMMARY OF THE INVENTION

The present invention initiates a server lookup after a 411 call in order to display the listing information in a graphical format and provide additional information. The server lookup may be initiated by a short message service (SMS), by an application-directed SMS (AD-SMS), which is hidden from the subscriber, or by the mobile device that initiated the call by detecting that "411" has been entered on the keypad.

An example method detects an occurrence of a 411 call event from a mobile device, sends a message from the mobile device based on the detected 411 call event, receives digital content at the mobile device from a server based on the sent message, and displays at least a portion of the received digital content on the mobile device.

In one aspect of the invention, the digital content includes at least one of textual and graphical content. The textual and graphical content includes a coupon, operational hours information, a map image, website information or other interactive content.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
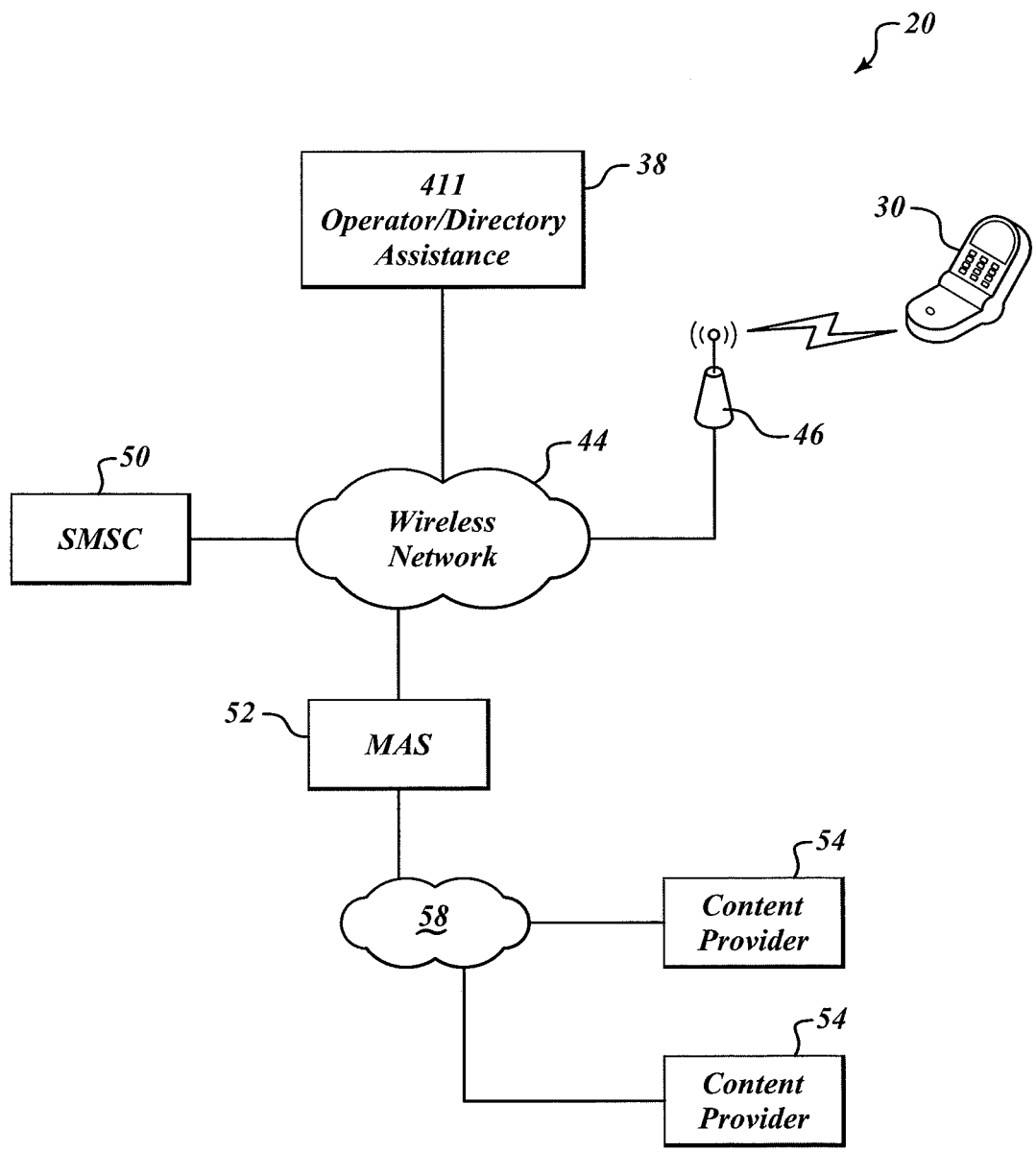
FIG. 1 is a schematic diagram of a system.

FIG. 1 illustrates a wireless/cellular system 20 that includes one of many mobile handsets 30, wireless/cellular nodes (also known as Mobile Switching Centers or MSCs) 46, a wireless network 44, a 411 operator or Directory Assistance center (DA) 38, a Messaging Application Server (MAS) 52, one or more content providers 54 and a Short Message Service Center (SMSC) 50. The handset 30 automatically determines if an incoming short message service (SMS) message is received from the DA 38. If the SMS message is from the DA 38, the handset 30 requests the MAS 52 to send content from the one or more content providers 54. The retrieved content is then sent to the handset 30 via the SMS message (the SMSC 50).

In one embodiment, the content providers 54 are in data communication with the MAS 52 via a network 58, such as a public or private data network. The MAS 52, the content providers 54, the SMSC 50 and the DA 38 are preferably computer-based systems that automatically perform some or all of the processes described herein. In another embodiment, the information associated with the content providers 54 is previously stored in databases associated with the MAS 52.

Figure 2:
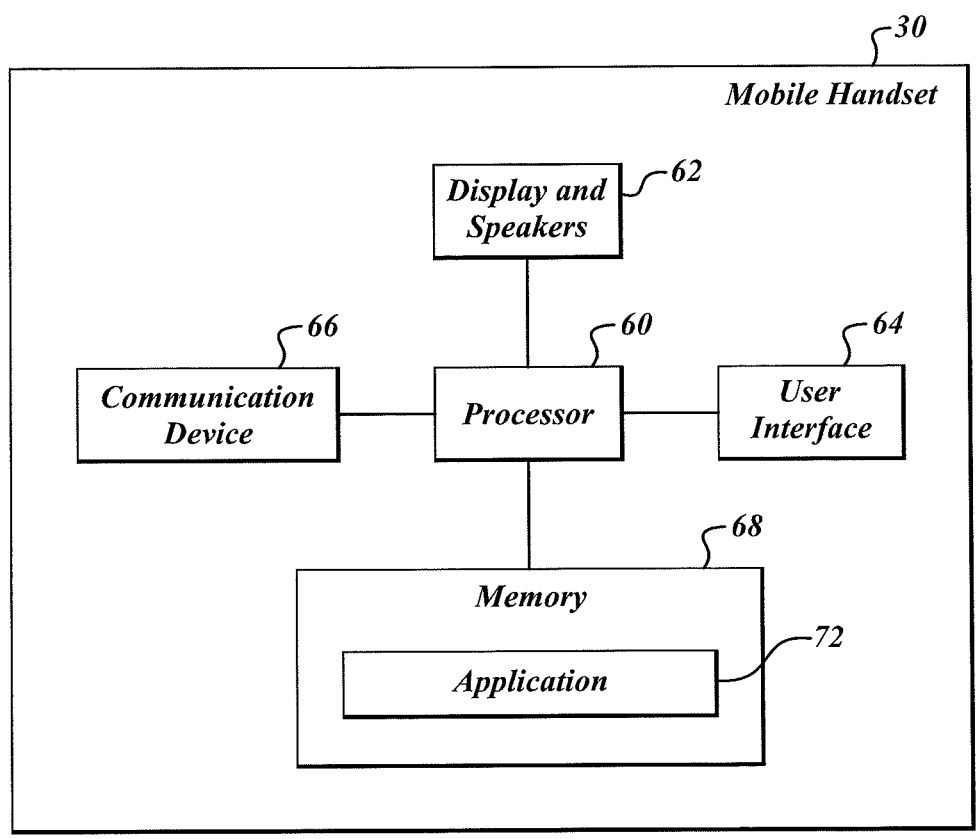
FIG. 2 is a block diagram of an example mobile handset formed in accordance with an embodiment of the present invention.

As shown in FIG. 2, an example of the mobile handset 30 includes a processor 60, output devices 62 (display(s) and/or speaker(s)), a user interface 64, a communication device 66, and memory 68. An application 72 is stored in the memory 68. When an SMS message is received, the processor 60 which is running the application 72 determines if the received SMS message is received from the DA 38 (e.g., formatted sender address information associated with the DA 38), then outputs an image and/or sound to the user of the handset 30. The mobile handset 30 may be a cell phone, mobile device, VoIP device, portable data assistant (PDA), or any comparable device.

Figure 3:
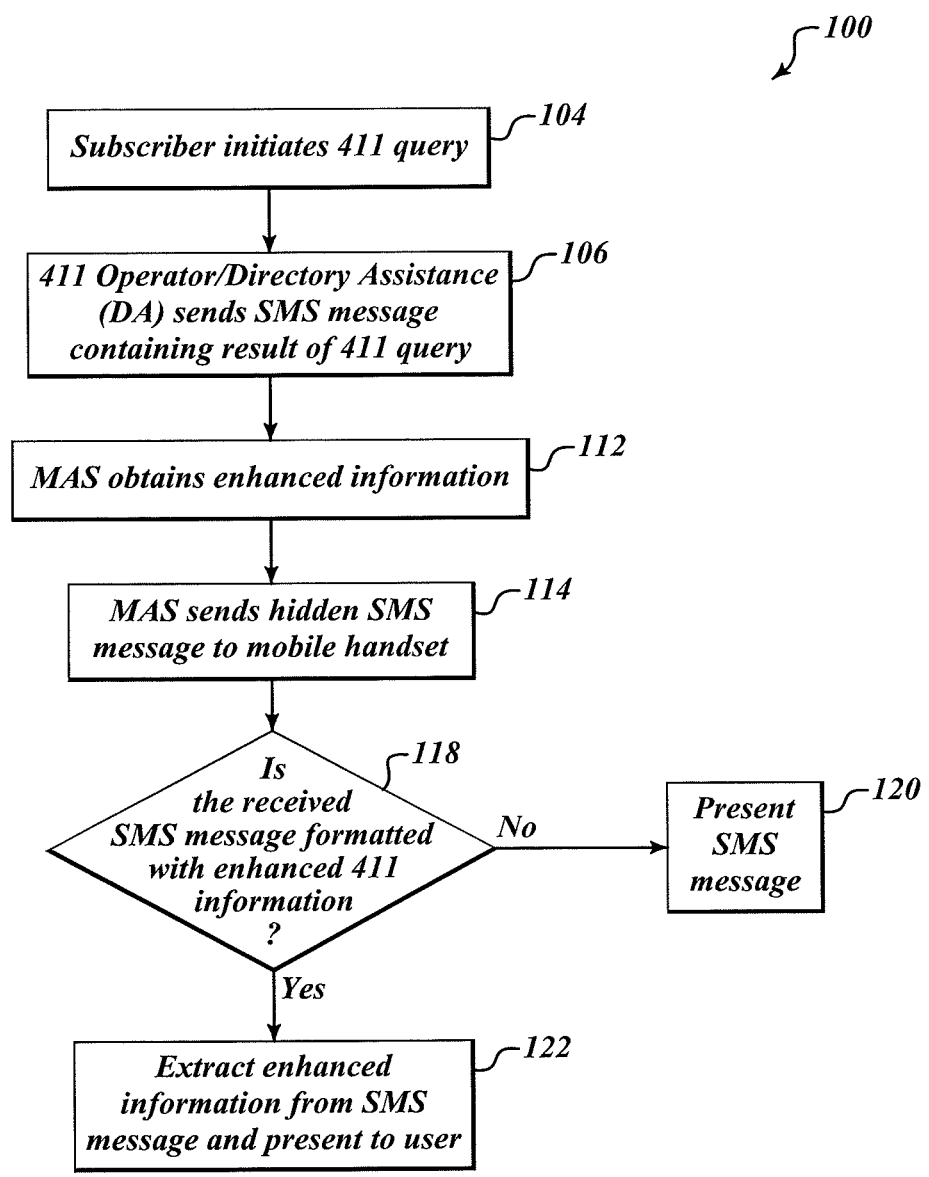
FIG. 3 is a flowchart of an example process performed by the handset shown in FIGS. 1 and 2.

FIG. 3 shows an example process 100 performed by the handset 30. First at a block 104, the user/subscriber initiates a 411 query with an operator at the DA 38. The 411 query includes a request for a phone number. At a block 106 the operator answers the query by finding the requested number (MDN), presents the findings to the subscriber (if multiple numbers are found), makes the connection, and sends an SMS message containing the requested MDN and/or associated listing information to the MAS 52 and/or the mobile handset 30. Options for further information are selected (or pre-configured). At a block 112, the MAS 52 obtains enhanced message information by retrieving the enhanced message information from the content provider 54 associated with the MDN or by using the XML containing the requested MDN and listing information. Next at a block 114, the MAS 52 sends a hidden SMS message using an application-directed (on code division multiplexing (CDMA)) or a port-directed (on GSM) SMS to the mobile device 30. When the SMS message containing the requested information is received by the subscriber, the format of 411 information is detected by the application 72 on the mobile handset 30, see decision block 118. If the SMS message is determined to include content associated with a 411 query, the processor 60 outputs an image on the display 62, see block 122.

In one embodiment, a popup display appears immediately with mixed text and graphics containing the information from the 411 listing supplemented by additional content, for example, items for subscriber interaction, containing coupons, location and map information, website information, and/or call-back information. Certain or all of the received 411 information and/or the enhanced, additional content received from the server may be store in the mobile device. For example, certain received 411 information pertaining to contact information may be stored in the caller directory. Certain of the enhanced, additional contact may also be stored in and subsequently accessed by the mobile device. Such storage may be done by automatically displaying the received 411 information to the subscriber along with an option to accept and store the received caller information on the mobile device, or to reject and discard it. In another embodiment the received 411 information is automatically displayed and stored in the mobile device.

If the received SMS message is not 411 formatted, then the SMS message is processed and presented, see block 120.

An advantage of the present invention is that the listing information is no longer limited to 160-characters. Moreover, the information displayed to the subscriber may contain additional information like hours of operation, payment options (i.e. Visa, Mastercard, Discovery), restaurant ratings, etc. The services described herein can be managed by the mobile carrier itself, contracted DA services, messaging application services, such as those offered by Cequint, Inc., or combinations thereof. Depending on the subscriber's choices, a carrier supported SMS service can direct the messages for delivery via SMS as contact information, as location and mapping information (for example, to interact with applications such as Networks in Motion's Navigator product), or as interactive content for advertising and retail services (for example, as provided by Cequint, Inc.'s IDML server).

The present invention allows for immediate delivery of 411 information and at the same time, without further subscriber action required, integrates seamlessly a variety of messages to the mobile subscriber. Graphical content may be included to show a picture of the business related to the listing, logos, and/or coupon offers. The content may support the integration of both ecommerce methods (e.g., Google AdSense, Amazon 1-click, EBay, etc.) and traditional retail advertising and sales (e.g., ad and brand placements, 800 numbers, etc.) on a single, automated screen display.

The present invention also allows integration of coupons and promotions, including software trials, with the display provided, and to engage in both order and payment directly via software communicating with the mobile device (e.g., PayPal or secured credit card transaction).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
   at a directory assistance center remote from a mobile device,
      detecting occurrence of a 411 call event from the mobile device;
      sending a number corresponding to a 411 query associated with the 411 call event, the number being sent to the mobile device in a first message, the first message being a short message service (SMS) message; and
      sending a message to a messaging application server remote from the mobile device based on the detected 411 call event and the associated number;
   at the messaging application server,
      retrieving enhanced message information from a content provider associated with the number; and
      sending a hidden message containing the retrieved enhanced message information to the mobile device, the hidden message being transmitted after transmitting the first message and being a separate SMS message from the first message; and
   at the mobile device,
      receiving the hidden message from the messaging application server;
      receiving the first message;
      determining that the first message is in response to the 411 event; and
      in response to determining that the first message is in response to the 411 event, displaying the information from the first message with at least a portion of digital content associated with the received hidden message in a common display element.

2. The method of claim 1, wherein the digital content comprises at least one of textual or graphical content.

3. The method of claim 2, wherein the textual or graphical content comprises at least one of a coupon, operational hours information, a map image, website information or interactive content.

4. The method of claim 3, wherein the interactive content comprises ecommerce content.

5. The method of claim 1, wherein at least one of sending and receiving is performed using at least one of a short message service (SMS), a coded application-directed SMS or session initiated protocol (SIP).

6. The method of claim 1, wherein the digital content comprises a phone number.

7. The method of claim 1, further comprising automatically storing at least a portion of the received digital content on the mobile device.

8. A mobile communication system comprising:
   at a directory assistance center remote from a mobile device,
      a means for detecting occurrence of a 411 call event from the mobile device;
      a means for sending a number to a 411 query associated with the 411 call event, the number being sent to the mobile device in a first message, the first message being a short message service (SMS) message; and
      a means for sending a message to a messaging application server remote from the mobile device based on the detected 411 call event and the associated number;
   at the messaging application server,
      a means for retrieving enhanced message information from a content provider associated with the number; and
      a means for sending a hidden message containing the retrieved enhanced message information to the mobile device after transmitting the first message and in a separate message from the first message; and
   at the mobile device,
      a means for receiving the hidden message from the messaging application server; and
      a means for displaying at least a portion of digital content associated with the received hidden message in combination with information from the first message in a common display element.

9. The device of claim 8, wherein the digital content comprises at least one of textual or graphical content.

10. The device of claim 9, wherein the textual or graphical content comprises at least one of a coupon, operational hours information, a map image, website information or interactive content.

11. The device of claim 10, wherein the interactive content comprises ecommerce content.

12. The device of claim 8, wherein the digital content comprises a phone number.

13. The device of claim 8, further comprising a means for automatically storing at least a portion of the received digital content on the mobile device.

14. A method comprising:
at a directory assistance center remote from a mobile device,
- detecting occurrence of a 411 call event from the mobile device;
- sending a number to a 411 query associated with the 411 call event, the number being sent to the mobile device in a first message, the first message being a short message service (SMS) message; and
- sending a second message to a messaging application server remote from the mobile device based on the detected 411 call event and the associated number;

at the messaging application server,
- retrieving enhanced message information from a content provider associated with the number; and
- sending a hidden message containing the retrieved enhanced message information to the mobile device, the hidden message being transmitted after transmitting the first message and being a separate SMS message from the first message; and at the mobile device,
- receiving the hidden message from the messaging application server;
- detecting that the first message is in response to the 411 call event; and
- in response to detecting that the first message is in response to the 411 call event, displaying content of the first message and hidden message in a common popup window.

* * * * *